US005785889A

United States Patent [19]
Greenfield et al.

[11] Patent Number: 5,785,889
[45] Date of Patent: Jul. 28, 1998

[54] ANISOTROPIC POLYMER

[75] Inventors: Simon Greenfield, Creekmoor Poole;
Mark John Goulding, Poole; Mark Verrall, Blandford; Owain Parri, Poole; George William Gray, Hull; David Coates, Wimborne; David Sherrington, Glasgow, all of Great Britain

[73] Assignee: Merck Patent Gesellschaft Mit Beschrankter Haftung, Darmstadt, Germany

[21] Appl. No.: 725,514

[22] Filed: Oct. 4, 1996

[30] Foreign Application Priority Data

Oct. 6, 1995 [EP] European Pat. Off. ............ 95115780

[51] Int. Cl.⁶ .................................................. C09K 19/38
[52] U.S. Cl. .......................... 252/299.01; 252/299.66; 428/1; 576/246; 576/313
[58] Field of Search .................................. 526/246, 313; 252/299.01, 299.66; 428/1

[56] References Cited

U.S. PATENT DOCUMENTS

| | | | |
|---|---|---|---|
| 4,661,576 | 4/1987 | Decobert et al. | 526/298 |
| 5,139,696 | 8/1992 | Fréchet et al. | 252/299.01 |
| 5,268,584 | 12/1993 | Dowell | 252/299.01 |

FOREIGN PATENT DOCUMENTS

| | | |
|---|---|---|
| 331 233 | 2/1989 | European Pat. Off. . |
| 405 713 | 4/1990 | European Pat. Off. . |
| 428 213 | 11/1990 | European Pat. Off. . |
| 423 881 | 4/1991 | European Pat. Off. . |
| 451 905 | 4/1991 | European Pat. Off. . |
| 606 940 | 1/1994 | European Pat. Off. . |
| 93/22397 | 11/1993 | WIPO . |

OTHER PUBLICATIONS

L. Powers et al (1975) Proc. Nat'l. Acad. Sci. 72(3), 840–843.

*Primary Examiner*—Mark Nagumo
*Attorney, Agent, or Firm*—Millen, White, Zelano, & Branigan, P.C.

[57] ABSTRACT

The invention relates to an anisotropic polymer film or polymer net-work obtainable by photopolymerization of at least one mesogene-containing compound, having two side chains attached to a mesogenic core structure one of which is polymerizable, the other of which is capable of forming association dimers by hydrogen bonds.

13 Claims, No Drawings

ANISOTROPIC POLYMER

The invention relates to an anisotropic polymer film or polymer network obtainable by photopolymerization of at least one mesogen-containing compound, having two side chains attached to a mesogenic core structure one of which is polymerizable and the other of which is capable of forming association dimers by hydrogen bonds.

The invention furthermore relates to a copolymerizable precursor material and to the use of the inventive copolymers in electrooptical scattering systems and in selectively reflecting polarizers.

Reactive liquid crystal compounds can be polymerized in situ, whilst in their liquid crystal phase, to give highly crosslinked anisotropic films which can be used, for example, as polarizing beam splitters (see, for example, EP 0,428,213). Reactive liquid crystal compounds have furthermore been proposed for electrooptical scattering systems (see, for example, EP 0,451,905), cholesteric polarizers (e.g. EP 0,606,940) and compensation films for STN displays (e.g. EP 0,423,881).

Reactive liquid crystal diesters of formula are mentioned in EP 0,261,712 (n=0), EP 0,331,233 (n=1). Reactive liquid crystal biphenyls of formula

are disclosed by EP 0,405,713.

The International Patent application WO 93/22397 discloses a compound of formula

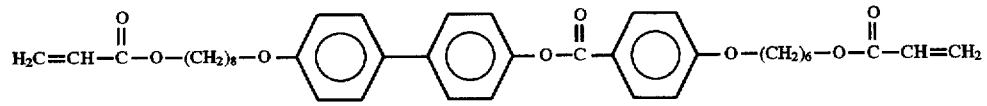

The polymers obtainable from these compounds often exhibit, however, rather high melting points, disadvantageous values of the birefringence and comparably narrow mesophase ranges.

In view of the broad range of applications of anisotropic polymers, it was desirable to have available further compounds of this type which fulfill the various requirements such as a reasonably low melting point, a high birefringence, a broad mesogenic phase range and preferably an enantiotropic nematic phase with a broad temperature range up to high temperatures.

It is an object of the present invention to provide new anisotropic polymers with advantageous properties thus extending the pool of anisotropic polymers available to the expert. Other objects of the present invention can be taken from the following detailed specification.

Upon further study of the specification and appended claims, further objects and advantages of this invention will become apparent to those skilled in the art.

The present invention thus relates to an anisotropic polymer film or polymer network obtainable by photopolymerization of at least one mesogen-containing compound, having two side chains attached to a mesogenic core structure one of which is polymerizable, the other of which is capable of forming association dimers by hydrogen bonds.

Preferred embodiments of the present invention are:

a) Anisotropic polymer film or polymer network wherein the mesogen-containing compound is a carboxylic acid, in particular a dimer of such a carboxylic acid.

b) Anisotropic polymer film or polymer network obtainable by photopolymerization of a compound of formula 1

$$R^1—(P)_u—Y—MG—COOH \tag{1}$$

in which
$R^1$ is $CH_2=CW—COO—$,

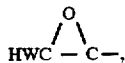

$HWN—$, $CH_2=CH—$, $CH_2=CH—O—$ or $HS—CH_2—(CH_2)_m—COO—$ with W being H, Cl or alkl with 1–5 C atoms and m being 1–7, P is alkylene with 1 to 12 C atoms, it being also possible for one or more non adjacent $CH_2$ groups to be replaced by $—O—$, Y is $—O—$, $—S—$, $—COO—$, $—OCO—$ or a single bond, MG is a mesogenic or mesogenity supporting group, and u is 0 or 1.

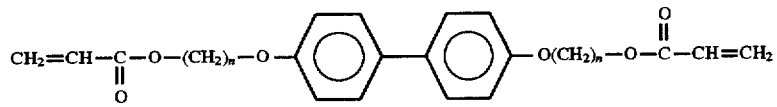

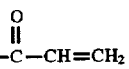

c) Anisotropic polymer film or polymer network in which MG is a mesogenic or mesogenity supporting group of formula ll, $$—(A^1—Z^1)_o—A^2— \tag{2}$$

in which
$A^1$ and $A^2$ are each independently
(a) 1,4-phenylene in which one or two CH groups may be replaced by N;
(b) 1,4-yclohexylene in which one or two non-adjacent $CH_2$ groups may be replaced by $—O—$ or one $—CH—$ group may be replaced by $—C(CN)—$,
(c) naphthalene-2,6-diyl;
it being possible that group (a) is substituted by halogen or cyano or alkyl, alkoxy or alkanoyl with 1 to 6 C atoms, $Z^1$ is each independently $—COO—$, $—O—CO$, $—CH_2—CH_2—$, $—C≡C—$, $—CH_2O—$, $—OCH_2—$ or a single bond, and O is 0 is0, 1,2or3.

Another aspect of the invention is a copolymerizable precursor material comprising at least one polymerizable chiral mesogenic compound and at least one reactive achiral compound of formula 1, in particular comprising at least one reactive compound of formula 1 in which R¹ is an acrylate radical of formula

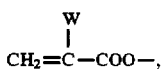

wherein W has the meaning given above.

Another aspect of the invention is a copolymerizable precursor material comprising at least one reactive chiral mesogenic compound and at least one compound of formula 1 in which Ri is a vinylether radical of formula CH₂=CH—O—.

Preferably the reactive chiral mesogenic compound is a compound of formula III $$R^1-(P)_u-Y-MG^1-Q^* \qquad (3)$$

in which R¹, P, Y and u have the meaning given for formula 1 and MG¹ has the meaning given for MG and Q* is a chiral wing group having at least one chiral C atom.

Q* is preferably selected according to the following formula:

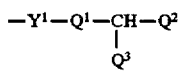

wherein

Y¹ has the meaning given for Y.

Q¹ is an alkylene or alkylene-oxy group with 1 to 10 C atoms or a single bond,

Q² is an alkyl or alkoxy group with 1 to 10 C atoms which may be un-substituted, mono- or polysubstituted by halogen or CN, it being also possible for one or more non-adjacent CH₂ groups to be replaced, in each case independently from one another, by —C≡C—, —O—, —S—, —NH—, —N(CH₃)—, —CO—, —COO—, —OCO—, —OCO—O—, —S—CO— or —CO—S— in such a manner that oxygen atoms are not linked directly to one another, Q³ is halogen, a cyano group or an alkyl or alkoxy group with 1 to 4 C atoms different from Q².

Preferred chiral groups Q* are 2-butyl(=1-methylpropyl), 2-methylbutyl, 2-methylpentyl, 3-methylpentyl, 2-ethylhexyl, 2-propylphenyl and 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-5 oxy, 2-fluorooctyloxy, 2-fluorodecyloxy, for example.

Mesogenic or mesogenity supporting groups as referred to in the foregoing and the following comprise rodlike or boardlike groups, for example the preferred groups MG and MG' shown below, or other groups. The term "mesogenity supporting group" in this connection is indicating that mesogenic compounds comprising such groups do not necessarily have to exhibit mesophase behavior by themselves.

It is also possible that they show mesophase behavior when in mixtures with other compounds, or after polymerization of the pure mesogenic compounds or of the mixtures comprising the mesogenic compounds.

Preferred are copolymerizable materials in which MG and MG¹ are independently selected from

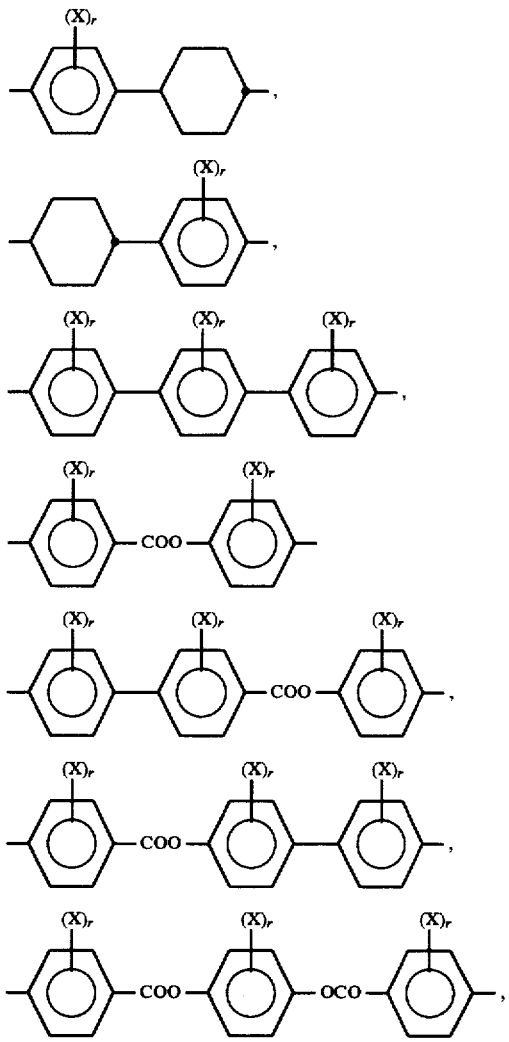

in which

X is CH₃, Cl, F, OCH₃ or —CO—CH₃, and r is 0, 1, 2, 3 or 4. In particular preferred are copolymerizable materials comprising at least one compound of formula Ia

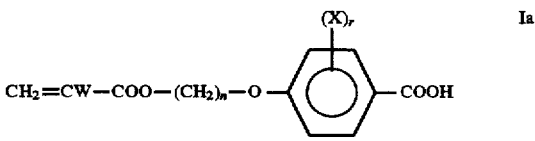

in which W, X and r have the meaning given above and n is an integer between 2 and 12.

In a particularly preferred embodiment the copolymerizable precursor material comprises at least two compounds of formula Ia with different spacer chain lengths.

Such copolymerizable materials preferably comprise a dimer of formula Ia1

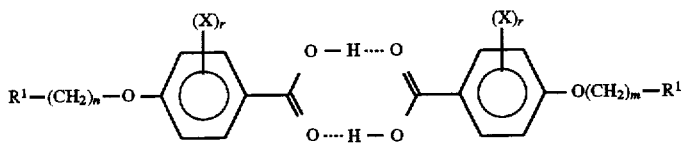

in which

R¹, X and r have the meaning given and n is an integer between 2 and 12 and m is an integer between 2 and 12 being different from n, in particular copolymerizable materials in which n and m pairs are given by the following table:

| m | 6 | 6 | 5 | 5 | 5 | 4 | 4 |
|---|---|---|---|---|---|---|---|
| n | 2 | 3 | 2 | 3 | 4 | 2 | 3 |

Above and below, the term reactive mesogenic compounds refers to polymerizable rod-like molecules which may exhibit enantiotropic or monotropic mesophases or may be isotropic, but, preferably have enantiotropic or monotropic mesophases.

In the compounds of formula 1 and III RI is preferably $CH_2=CW—COO—$, $CH_2=CH—O—$ or

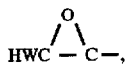

with W being $H_1$, Cl or alkyl with 1–5 C atoms.

Preferably, R¹ is a vinyl group, an acrylate group or an epoxy group and especially preferred are the following meanings of R¹:

| | |
|---|---|
| $CH_2=CH—COO—$ | $R^1$-1 |
| $CH_2=C—COO—$ <br> \| <br> $CH_3$ | $R^1$-2 |
| $CH_2=C—COO—$ <br> \| <br> $Cl$ | $R^1$-3 |
| $CH_2=CH—O—$ | $R^1$-4 |
| 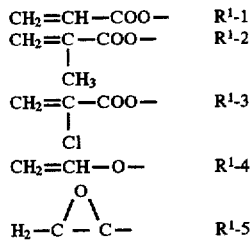 | $R^1$-5 |

The polymerizable compounds of formula 1a are known, for example, from U.S. Pat. No. 4,661,576 in which they are used for the preparation of polymerizable esters of formula

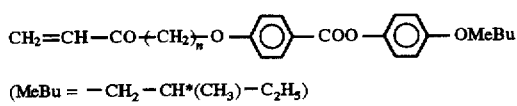

(MeBu = $—CH_2—CH^*(CH_3)—C_2H_5$)

However, there is no hint to polymerize these intermediates as such.

In the following and in the preceding, all percentages given are percentages by weight. Temperatures are given in degrees Celsius.

The following examples are intended to illustrate the invention without restricting it.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding European application 95115780.9, filed Oct. 6, 1995, are hereby incorporated by reference.

EXAMPLES

Example 1

The reactive liquid crystalline compounds of formula 1a1 wherein W is H are obtained according to the process disclosed in USP 4,661,576. Their dimers of formula 1A1 exhibit the following properties:

| Dimer No. | m | n | phase transition temperatures (°C.) |
|---|---|---|---|
| (1) | 3 | 3 | K 118–124 I |
| (2) | 6 | 6 | K 80–90 $S_c$ 102 N 109.5 I |
| (3) | 3 | 6 | K < 0 $S_c$ 79 N 104 I |

Example 2

A mixture is formulated comprising

50% by weight of dimer No. (2) of Example 1 and

50% by weight of a chiral polymerizable compound of formula

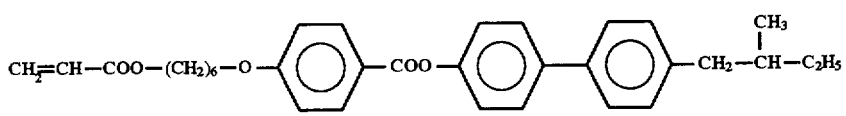

This composition has a selective reflection maximum at 620 nm and appears red in color. 1% by weight of Irgacur 651 (commercially available photoinitiator by Ciba Geigy, Basel, Switzerland) are added and the resulting composition is heated to 75° C. and oriented as a red film between uniaxially rubbed polyimide-treated glass slides and exposed for 5 minutes to UV radiation. A polymerized anisotropic network exhibiting selective reflection is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An anisotropic polymer film or polymer network prepared by photopolymerization of at least one mesogen-containing compound having two side chains attached to a mesogenic core structure, one side chain being polymerizable, the other side chain being capable of forming association dimers by hydrogen bonds, such that the polymer film or polymer network contains mesogen-containing compounds polymerized by the polymerizable side chains and hydrogen-bonded by the other side chains to form association dimers.

2. The polymer film or polymer network of claim 1 which is prepared from only one mesogen-containing compound and such that it contains identical mesogen-containing compound units.

3. The anisotropic polymer film or polymer network according to claim 1, wherein the mesogen-containing compound is a carboxylic acid compound.

4. The anisotropic polymer film or polymer network according to claim 1 prepared by photopolymerization of a compound of formula 1

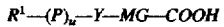  (1)

in which $R^1$ is $CH_2=CW$—COO—,

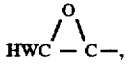

HWN—, $CH_2=CH$—, $CH_2=CH$—O— or HS—$CH_2$—$(CH_2)_m$—COO— with W being H, Cl or alkyl with 1–5 C atoms and m being 1–7, P is alkylene with 1 to 12 C atoms, optionally having one or more non-adjacent $CH_2$ groups replaced by —O—, Y is —O—, —S—, —COO—, —OCO— or a single bond, MG is a mesogenic or mesogenity supporting group, and u is 0 or 1.

5. The anisotropic polymer film or polymer network according to claim 4, wherein MG is a mesogenic or mesogenity supporting group of formula ll

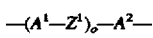  (2)

in which $A^1$ and $A^2$ are each independently
(a) 1,4-phenylene in which one or two CH groups are optionally replaced by N;
(b) 1,4-cyclohexylene in which one or two non-adjacent $CH_2$ groups are optionally replaced by —O— or one —CH— group is optionally replaced by —C(CN)—; or
(c) naphthalene-2,6-diyl; group (a) optionally being substituted by halogen or cyano or alkyl, alkoxy or alkanoyl with 1 to 6 C atoms, $Z^1$ are each independently —COO—, —O—CO—, —$CH_2$—$CH_2$—, —C≡C—, —$CH_2$O—, —O$CH_2$— or a single bond, and o is 0 is 0, 1, 2 or 3.

6. A copolymerizable precursor material comprising at least one polymerizable chiral mesogenic compound and at least one reactive achiral compound of formula I of

  (1)

in which $R^1$ is $CH_2=CW$—COO—,

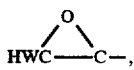

HWN—, $CH_2=CH$—, $CH_2=CH$—O— or HS—$CH_2$—$(CH_2)_m$—COO— with W being H, Cl or alkyl with 1–5 C atoms and m being 1–7.

P is alkylene with 1 to 12 C atoms, optionally having one or more non-adjacent $CH_2$ groups relaced by —O—.

Y is —O—, —S—, —COO—, —OCO— or a single bond,

MG is a mesogenic or mesogenity supporting group, and u is 0 or 1.

7. The copolymerizable precursor material according to claim 6 comprising at least one polymerizable chiral mesogenic compound and at least one bifunctional reactive achiral compound of formula 1 in which $R^1$ is an acrylate radical of formula $$CH_2=\overset{W}{\underset{|}{C}}-COO-,$$

wherein W is H, Cl or alkyl with 1–5 C atoms.

8. The copolymerizable precursor material according to claim 6, comprising at least one polymerizable chiral mesogenic compound and at least one compound of formula 1 in which $R^1$ is a vinylether radical of formula $CH_2=CH$—O—.

9. The copolymerizable precursor material of claim 6, wherein the polymerizable chiral mesogenic compound is of the formula lll:

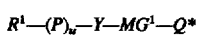  (3)

wherein $R^1$, P, u and Y are as defined;

$MG^1$ is independently as defined for MG; and $Q^*$ is a group containing at least one chiral C atom.

10. The copolymerizable precursor material according to claim 9 in which MG and $MG^1$ are each independently selected from

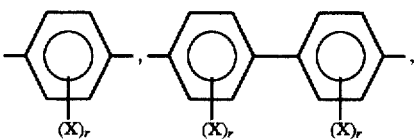

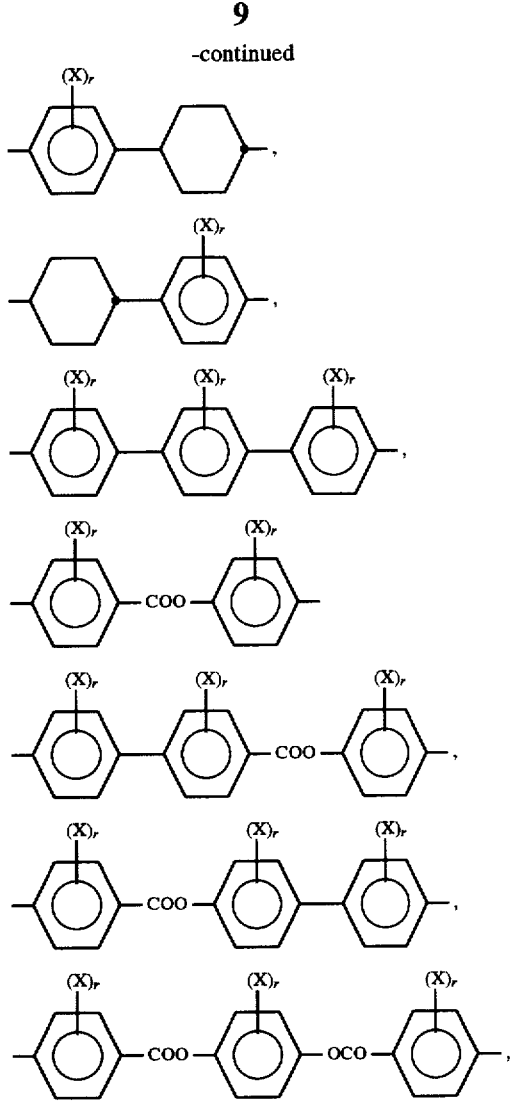

in which

X is $CH_3$, Cl, F, $OCH_3$ or $-CO-CH_3$, and r is 0, 1, 2, 3 or 4.

11. The copolymerizable material according to claims 6 comprising at least one compound of formula Ia

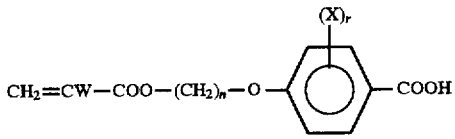

Ia in which W is H, Cl or alkyl with 1–5 C atoms,

X is $CH_3$, Cl, F, $OCH_3$ or $-CO-CH_3$, r is 0, 1, 2, 3 or 4, and n is an integer of from 2 to 12.

12. The copolymerizable precursor material according to claim 11 comprising at least two compounds of formula Ia with different values for.

13. A method for preparing a polymer film or polymer network which comprises photopolymerizing at least one mesogen-containing compound having two side chains attached to a mesogenic core structure, one side chain being polymerizable, the other side chain being capable of forming association dimers by hydrogen bonds, such that the polymerizable side chains polymerize and the other side chains hydrogen bond to form association dimers.

* * * * *